(12) United States Patent
De'Longhi

(10) Patent No.: US 6,250,213 B1
(45) Date of Patent: Jun. 26, 2001

(54) DEVICE FOR MOVING THE BASKET OF A FRYER

(75) Inventor: Giuseppe De'Longhi, Treviso (IT)

(73) Assignee: De'Longhi S.p.A., Treviso (IT)

( * ) Notice: Subject to any disclaimer, the term of this patent is extended or adjusted under 35 U.S.C. 154(b) by 0 days.

(21) Appl. No.: 09/481,284

(22) Filed: Jan. 11, 2000

(30) Foreign Application Priority Data

Jan. 12, 1999 (IT) .............................................. MI990009 U

(51) Int. Cl.⁷ ............................... A47J 37/12; A47J 37/10
(52) U.S. Cl. .................. 99/407; 99/412; 99/414; 99/413
(58) Field of Search ............................. 99/407, 403, 412, 99/413, 414, 415, 416, 417, 418; 126/391, 350 R

(56) References Cited

U.S. PATENT DOCUMENTS

| 1,198,374 | * | 9/1916 | Overbury | 99/410 |
| 3,078,786 | * | 2/1963 | Arvan | 99/407 |
| 5,379,684 | * | 1/1995 | Ettridge | 99/407 X |
| 5,746,117 | * | 5/1998 | Chang | 99/407 |
| 6,006,658 | * | 12/1999 | Siu | 99/410 X |

* cited by examiner

Primary Examiner—Reginald L. Alexander
(74) Attorney, Agent, or Firm—Herbert Dubno

(57) ABSTRACT

A device for moving the basket of a fryer including a support body having hinged therein, on a first side, a bow member engaging its ends with the fryer basket, and, on a second side, a handle of the basket engaging the bow member. The device includes basket guide members for transforming a rotary motion of the handle and of the bow member about their respective axes of hinging to the support body, into a translatory motion of the basket inside said fryer.

13 Claims, 4 Drawing Sheets

DEVICE FOR MOVING THE BASKET OF A FRYER

FIELD OF THE INVENTION

The present invention relates to a device for moving the basket of a fryer.

BACKGROUND OF THE INVENTION

Currently known fryers comprise an oil-containing tank for frying the food products that are generally contained in a basket.

The fryer basket may be stationary, i.e. can be manually inserted and removed from the oil tank of the fryer, or mobile, i.e. may be moved inside the tank by means for example by a mechanism activated by the rotation of the basket handle.

In this last case, the motion of the basket can be effected with the lid closing the fryer and therefore with several advantages.

The moving mechanism of the fryer basket is, however, rather complex and, therefore, tends to malfunction in the long run also because of food residues that clog the mechanism.

A further consequence of the complexity of the mechanism for moving the fryer basket is its high production cost that results in a high retail cost of the fryer.

Furthermore, the prior art mechanisms used to move the basket up and down in the tank also involve movements along different directions that may lead the basket to rub the walls of the tank.

This continuous rubbing eventually leads to scratching of the basket and/or tank surface which may be constituted by an anti-adherent material.

The scratching also causes particles of unwanted material to fall into the cooking oil.

OBJECTS OF THE INVENTION

It is an object of the present to eliminate the above described inconveniences of the cited prior art.

An important object of the invention is to provide a device for moving the basket of a fryer limiting such operation to movement only along one direction.

A further object of the invention is to provide a device for moving the basket of a fryer which is extremely simple and effective in order to ensure a long life of the device at least as long as the life of the fryer.

A further object of the invention is to provide a device for moving the basket of a fryer that prevents any scratching of the basket against the tank surfaces thus preventing any damage to the tank and to its anti-adherent lining that may generate particles of unwanted material that may pollute the cooking oil.

Still a further object of the invention is to provide a device for moving the basket of a fryer such that the motion of the basket is always guided and controlled by the rotation of the basket handle.

SUMMARY OF THE INVENTION

The above and other objects that will be more apparent hereinafter, are achieved by a device for moving the basket of a fryer comprising a support body having hinged therein on a first side a bow member engaging with its ends the fryer basket, and on a second side a handle of said basket engaging said bow member, said device further comprising a basket guide means for transforming a rotary motion of said handle and of said bow member about their respective axes of hinging to said support body, into a translatory motion of said basket inside said fryer.

Further characteristics and advantages of the invention will be more apparent by the following description of an embodiment of the invention, illustrated, by way of example in the enclosed drawing.

BRIEF DESCRIPTION OF THE DRAWING

The above and other objects, features, and advantages will become more readily apparent from the following description, reference being made to the accompanying drawing in which.

DESCRIPTION OF THE PREFERRED EMBODIMENTS OF THE INVENTION

Figure 1:
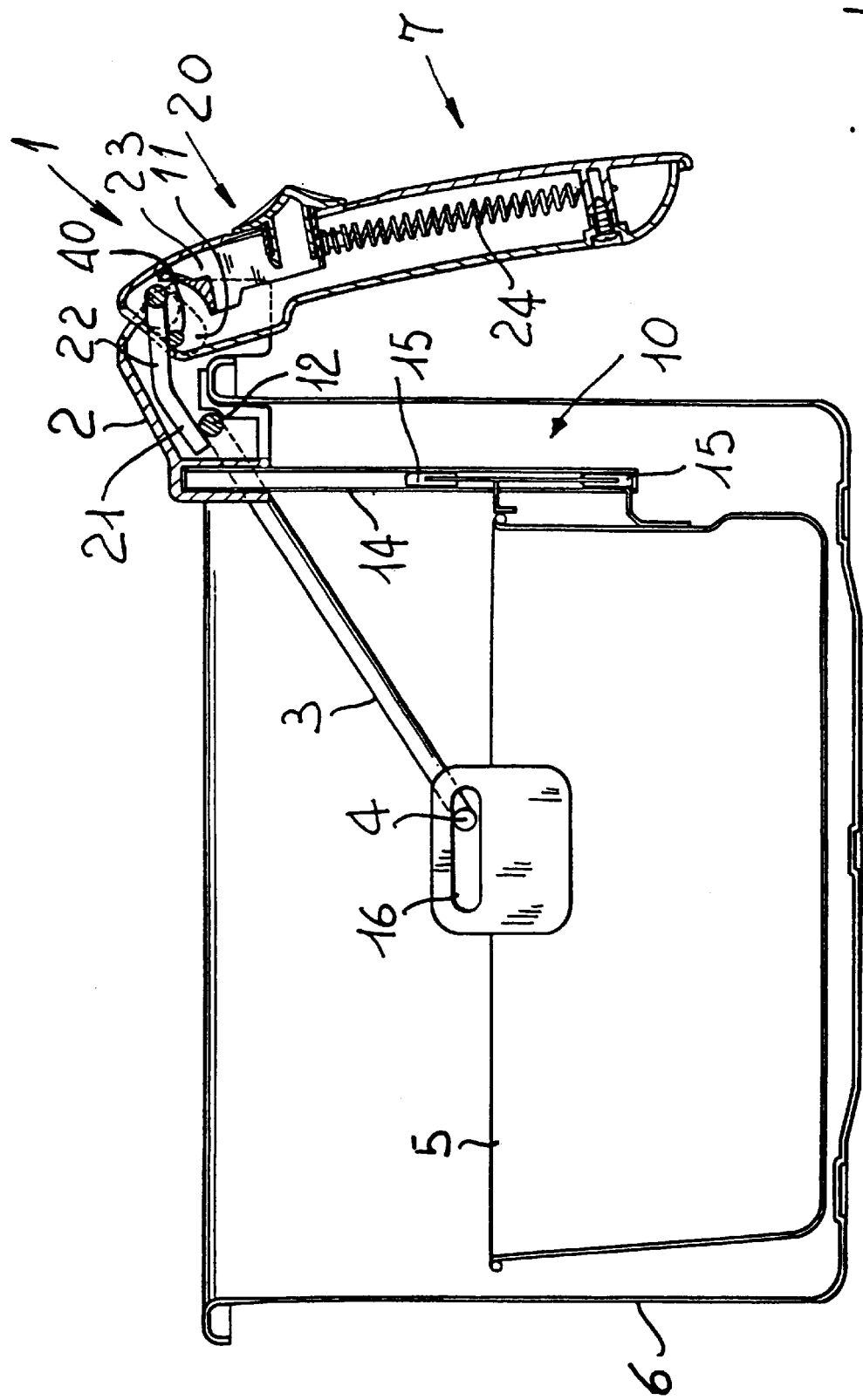
FIG. 1 is a cross sectional side view of the device for moving the basket of a fryer according to the invention.

With reference to the above figures, the device 1 according to the invention comprises a support body 2 having hinged therein on a first side a bow member 3 having its ends 4 engaging a basket 5 arranged inside a tank 6 of the fryer and, on a second or opposite side, a basket handle 7.

Conveniently, the device also comprises a guide means 10, adapted to transform the rotary motion of handle 7 and of the bow member 3, about their respective hinge axes 11 and 12 with the support body 2, into a translatory motion of the basket inside the tank 6 of the fryer.

More particularly, the guide means 10 comprises at least one track member, and more particularly two parallel facing track members 14 extending from the support body parallel to at least one wall of the tank 6 containing the oil for frying the food product contained in the basket 5.

The guide means also comprises at least one slider and in particular, in the illustrated example, four sliders 15 slidingly associated, on one hand with the track members 14, and on the other hand rigidly associated with the basket 5.

The sliders 15 are mutually spaced apart and co-planar in order to provide the basket, which is sliding along the two track members 14, with a good horizontal and lateral stability even if loaded with the food product.

In order to promote the sliding action of the sliders inside the track members 14, the sliders comprise an anti-friction coating also having the function of preventing play inside the tracks 14.

Conveniently, the ends 4 of bow member 3 engage respective slots 16 provided on the upper rim of basket 5.

In this manner, when the sliders 15 are sliding inside the track members 14, the end 4 will correspondingly slide inside the slots 16 of the basket, as the slots 16 extend substantially at right angles with respect of the track members 14.

The handle 7 is also provided with detent members 20 for retaining the bow member 3 in at least one first position corresponding to the raised position of the basket inside the fryer tank 6.

The bow member has an extension 21 engaging the detent members 20 for keeping the basket in the raised position when the handle is rotated into a substantially horizontal position.

The extension 21 is preferably, but not necessarily, "C"-shaped and has its curved position 22 lying on a plane angled with respect the plane where part of the legs 21 of the "C" connected to the bow member and parallel thereto, lie.

The extension 21 may be provided, according to need, integral with the bow member 3 or as a separate component part, as illustrated in the drawings.

The detent members 20 are defined by an engaging member 23 adapted to engage the curved portion 22, which is mobile, and by the action of elastic means, particularly a spring 24, inside the handle 7.

Conveniently, the engaging member 23 comprises an end portion 25 engaging the curved portion 22 in order to keep the basket 5 in a first raised position inside the tank 6 when the handle 7 is in a substantially horizontal position.

The extension 21 also has a rod 40 hinged to the handle 7 by being engaged into holes 41 of the handle.

On each of its sides, the handle 7 is also provided with a pin 50 engaging a guide 51 provided on the support body and defining the pivot axis of the handle.

The operation of the device for moving the basket of a fryer, according to the invention, is apparent from what has been described and illustrated.

Figure 2:
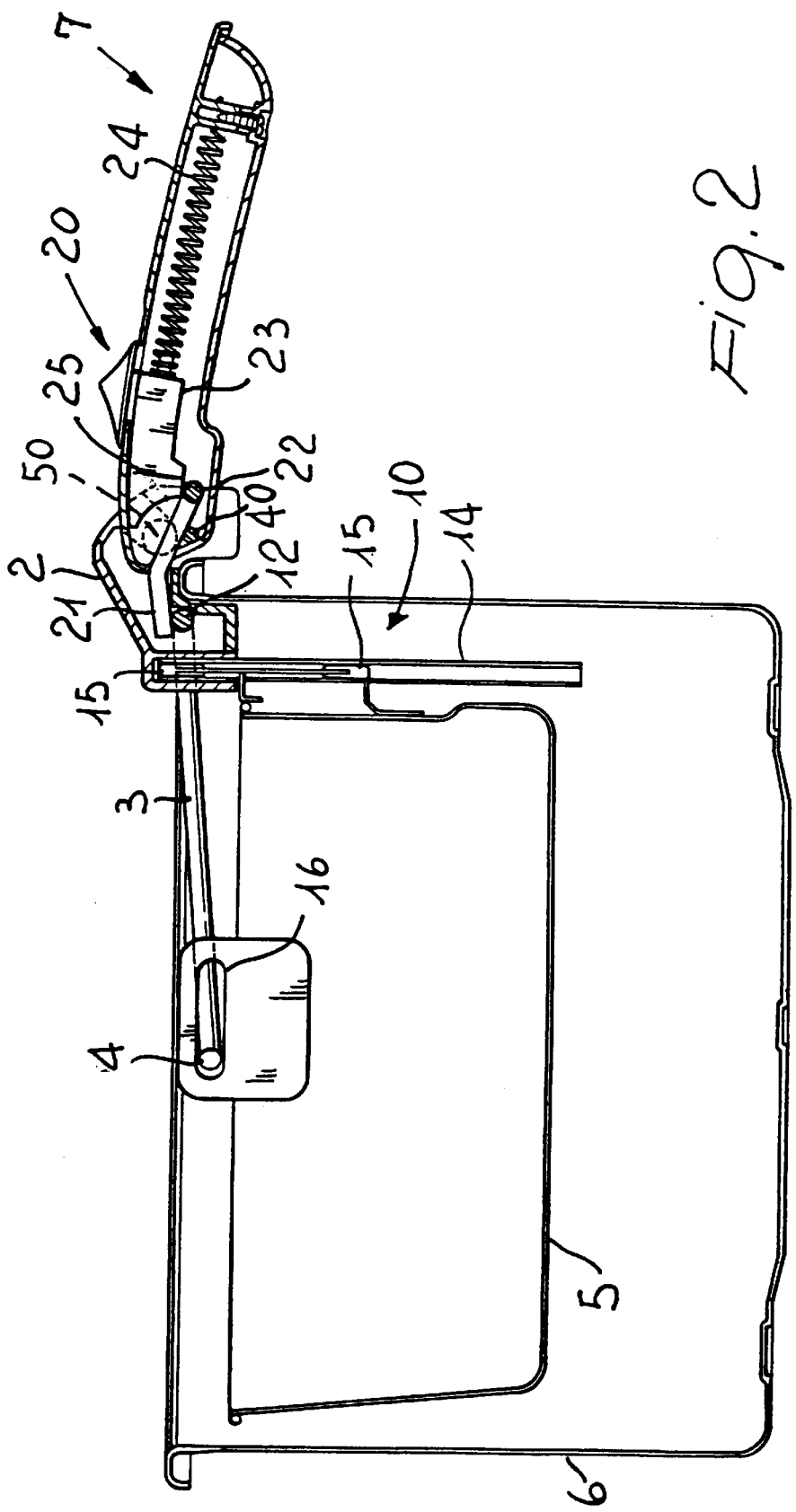
FIG. 2 shows the device of FIG. 1 wherein the basket is raised and the basket handle is in a substantially horizontal position, according to the invention.
Figure 3:
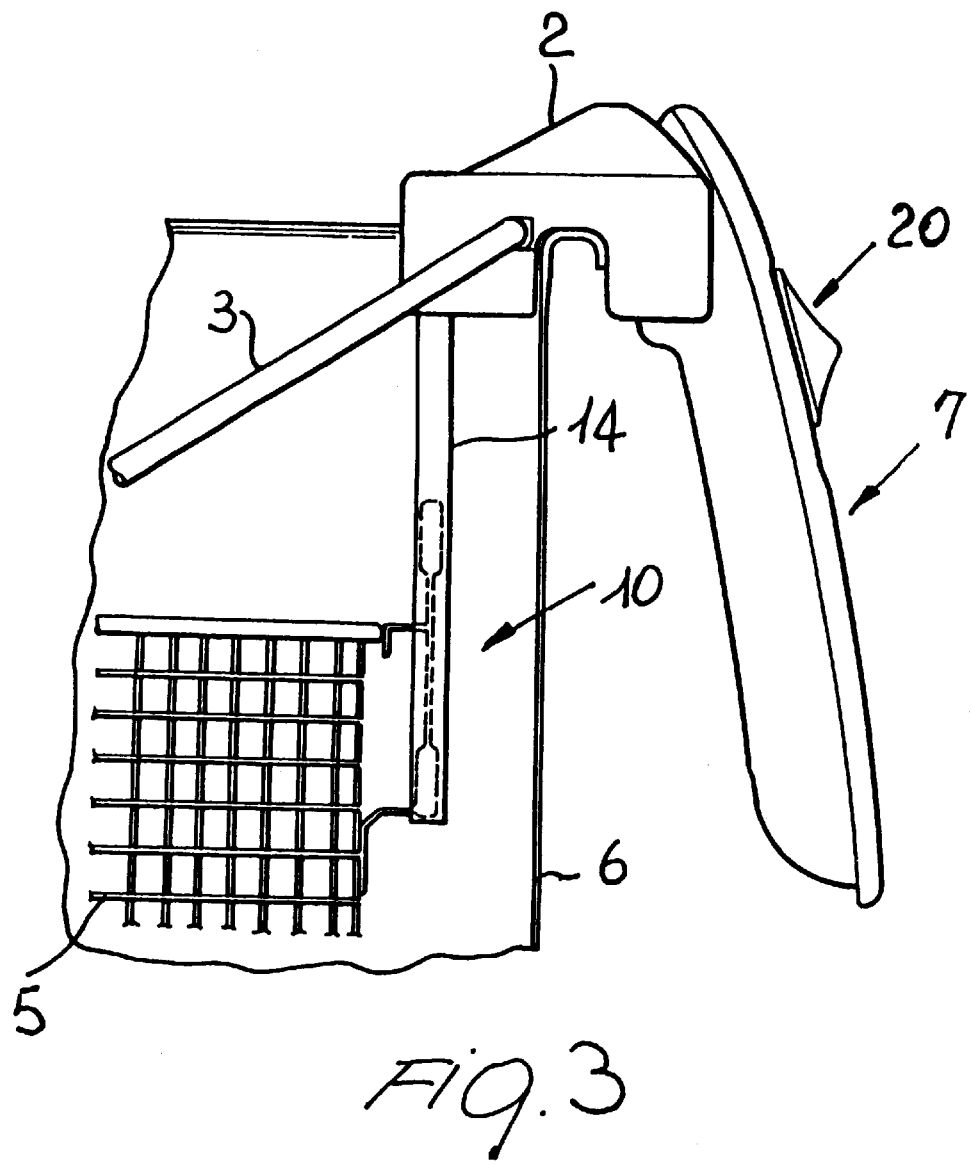
FIG. 3 shows the guide means according to the invention in detail.
Figure 4:
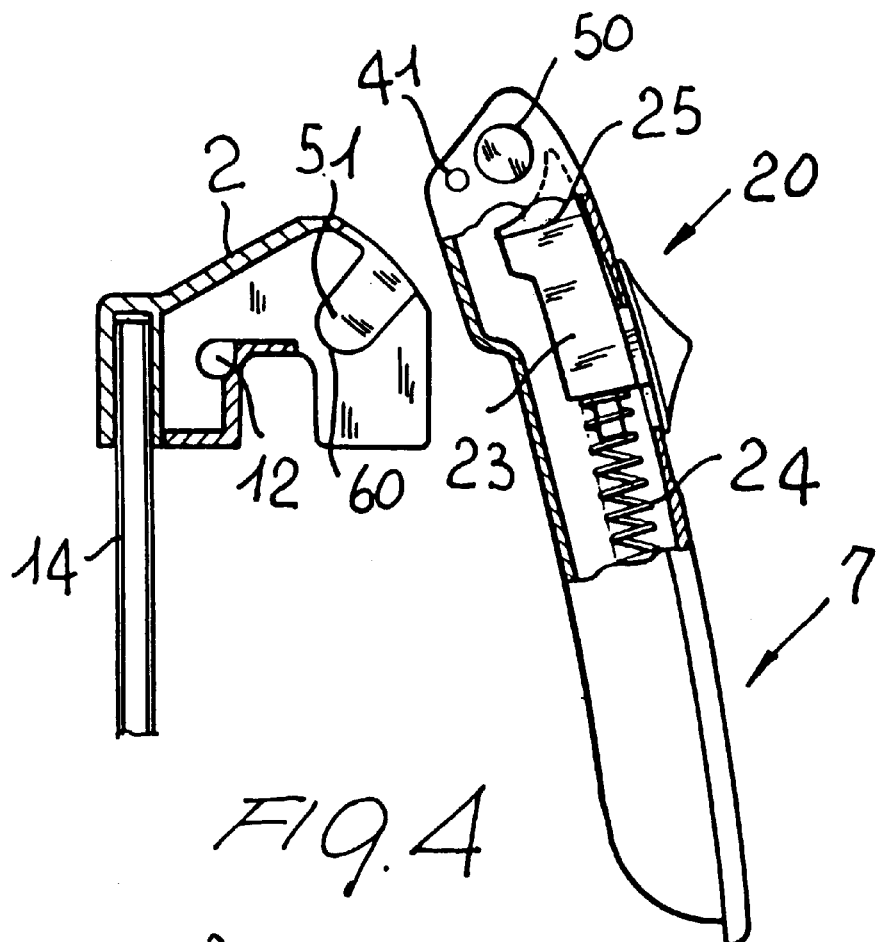
FIG. 4 is a partially sectioned exploded view of the basket handle separated from the support body, according to the invention.
Figure 5:
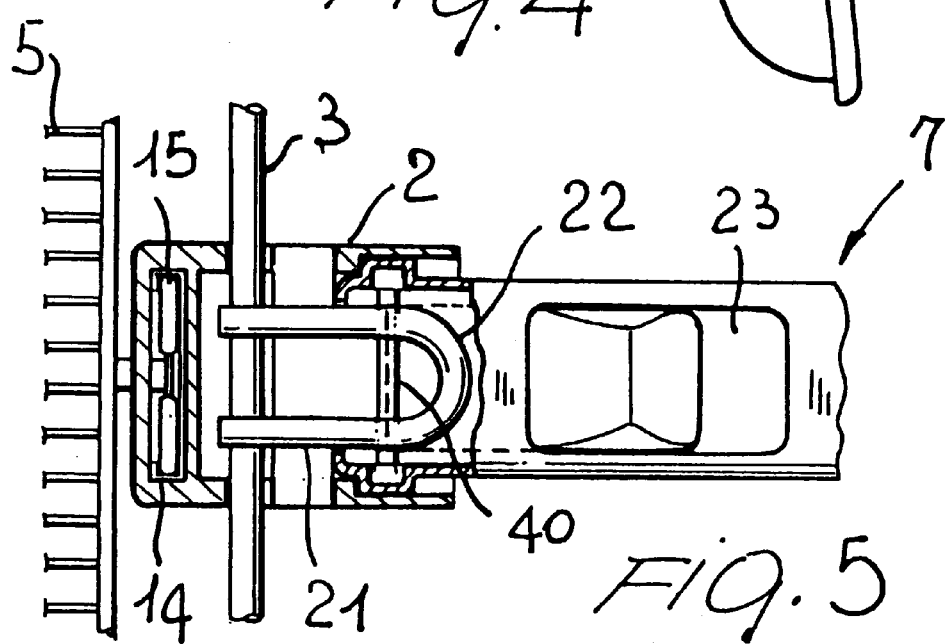
FIG. 5 is a partially sectioned top plan view of the hinge of the basket bow member to the handle and the support body, according to the invention.

In particular, once the support body has been associated with the fryer, and therefore to the tank of the fryer, the basket 5 can be brought from a lower position, shown in FIG. 1, to a raised position, shown in FIG. 2.

For example, starting from the lower position, by rotating the handle the pins 50 are caused to slide and rotate in the respective guides 51.

The motion of the pins 50 towards the bottom 60 of the guides 51 is due mainly to the double hinge of the bow 3 and in particular, on one side, to its hinging to the support body 2, and on the other side, through the hinge of the rod 40 to the handle 7.

In such manner the bow 3 may be caused to rotate about the hinge axis 12 with the support body in a progressive way and together with the rotation of the handle.

The ends 4 of the bow slide along slots 16 pushing up the basket 5 that is thus made to slide linearly along the track members 14 by means of sliders 15.

Once the basket is completely raised, the engaging member 23, biased by spring 24, will upwardly engage the curved portion 22 thus keeping the basket 5 in the raised position with the handle substantially horizontal, as shown in FIG. 2.

In order to lower the basket 5 inside the tank 6, it is sufficient to operate the engaging member 23 backwards against the action of spring 24.

In this manner the pins 50 will rotate and slide in the guides 51, further from their bottom 60, in order to allow the basket 5 to descent progressively, and together with the rotation of the handle, down to the lower position wherein the handle is in a substantially vertical position.

It has been observed how the device according to the invention is particularly convenient in allowing the motion of the basket to be always parallel to one or more walls of the tank where it is arranged in order to prevent any scratching of the basket against the tank walls and the same time simplifying the raising mechanisms which is therefore more reliable and useful and of low cost.

The materials employed, as well as the dimensions, may be any according to the specific needs and the state of the art.

What is claimed is:

1. A device for moving the basket of a fryer comprising:
a support body having hinged therein on a first side a bow member engaging its ends with the fryer basket, and on a second side a handle of said basket engaging said bow member; and
a basket guide means for transforming a rotary motion of said handle and of said bow member about their respective axes of hinging to said support body, into a translatory motion of said basket inside said fryer, said handle comprising an engaging means for engaging said bow member in at least one first position corresponding to a raised position of said basket inside said fryer;
said bow member having an extension engaging said engaging means for keeping said basket in said raised position when said handle has been rotated into a substantially horizontal position;
said extension comprising a rod hinged to said handle;
said handle comprising, on each side, a pin engaging, through a rotating and sliding motion, a corresponding guide provided on said support body.

2. The device according to claim 1, wherein said guide means comprises at least one guide member extending from said support body and forming a track parallel to at least one wall of the tank when said support body is associated with said fryer.

3. The device according to claim 2, which comprises at least one slider associated on one side to said track and on the other side to said basket.

4. The device according to claim 3, wherein at least one slider comprises a lining made of anti-friction material for easing its sliding in said at least one track.

5. The device according to claim 4, wherein said ends of said bow engage respective slots provided on said basket.

6. The device according to claim 5, wherein said slots extend in a direction substantially at a right angle to said track.

7. The device according to claim 6, wherein said engaging means comprises an engaging member engaging said extension, said engaging member being mobile in said handle biased by elastic means.

8. The device according to claim 7, which comprises at least two track members wherein four sliders are engaged and are spaced apart in order to give lateral stability to said basket.

9. A fryer comprising a tank containing oil and wherein a basket, carrying the product to be fried is movable and provided with a support body handle, and a bow member engaged with the handle said basket comprising a basket guide means for transforming a rotary motion of said handle and of said bow member about their respective axes of hinging to said support body, into a translatory motion of said basket inside said fryer, said guide means comprises at least one track member extending parallel to at least one wall of said oil said containing tank and at least one slider associated at one side slidingly with said track and on the other side with said basket.

10. A device for moving a basket of a fryer comprising:
a support body adapted to be mounted on a fryer;
a bow member hinged in said support body and engaging respective ends with a fryer basket;

a handle for manipulating said basket hinged on said support body and engaging said bow member;

opposite means for constraining said basket to linear movement in said fryer parallel to a wall thereof; and a basket actuating means for transforming a rotary motion of said handle and of said bow member about their respective axes into a translatory motion of said basket in said fryer.

11. The device defined in claim 10 wherein said handle comprises an engaging means for engaging said bow member in at least one position corresponding to a raised position of said basket inside said fryer.

12. The device defined in claim 11 wherein said bow member has an extension engaging said engaging means for keeping said basket in said raised position when said handle has been rotated into a substantially horizontal position.

13. The device defined in claim 12 wherein said extension comprises a rod hinged to said handle.

* * * * *